(12) United States Patent
Jones

(10) Patent No.: US 9,975,060 B2
(45) Date of Patent: *May 22, 2018

(54) LIQUID PURIFICATION SYSTEM

(71) Applicant: John D Jones, Phoenix, AZ (US)

(72) Inventor: John D Jones, Phoenix, AZ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/607,262

(22) Filed: May 26, 2017

(65) Prior Publication Data

US 2017/0260063 A1    Sep. 14, 2017

Related U.S. Application Data

(63) Continuation of application No. 14/265,412, filed on Apr. 30, 2014, now Pat. No. 9,663,385.

(60) Provisional application No. 61/902,258, filed on Nov. 10, 2013.

(51) Int. Cl.

| | | |
|---|---|---|
| *B03D 1/24* | (2006.01) | |
| *B01D 3/06* | (2006.01) | |
| *C02F 1/20* | (2006.01) | |
| *C02F 1/38* | (2006.01) | |
| *C02F 103/36* | (2006.01) | |
| *C02F 101/32* | (2006.01) | |
| *C02F 101/10* | (2006.01) | |
| *C02F 103/10* | (2006.01) | |

(52) U.S. Cl.
CPC ............ *B01D 3/06* (2013.01); *C02F 1/20* (2013.01); *C02F 1/38* (2013.01); *C02F 2101/101* (2013.01); *C02F 2101/32* (2013.01); *C02F 2101/322* (2013.01); *C02F 2103/10* (2013.01); *C02F 2103/365* (2013.01)

(58) Field of Classification Search
None
See application file for complete search history.

(56) References Cited

U.S. PATENT DOCUMENTS

| | | |
|---|---|---|
| 4,279,743 A | 7/1981 | Miller |
| 4,397,741 A | 8/1983 | Miller |
| 4,399,027 A | 8/1983 | Miller |
| 4,880,542 A | 11/1989 | Sublette |
| 4,997,549 A | 3/1991 | Atwood |
| 5,122,165 A | 6/1992 | Wang et al. |

(Continued)

FOREIGN PATENT DOCUMENTS

| | | |
|---|---|---|
| CN | 1046753 C | 8/1994 |
| CN | 2348097 Y | 3/1998 |

(Continued)

OTHER PUBLICATIONS

Miroslav Colic, et al., "From Air Sparged Hydrocyclone to Gas Energy Mixing (GEM) Flotation," May 2001 ZPM Inc.—Clean Water Technology, Inc., R&D Division 5770 Thornwood Drive, Suite C Goleta, CA 93117.

(Continued)

*Primary Examiner* — Thomas M Lithgow

(57) ABSTRACT

The present invention relates to apparatuses, systems, and methods to cleanse water contaminated with hydrocarbons, hydraulic fracturing fluids, volatile organic compounds, sulfurous compounds, crude oil, and other petroleum products. The products recovered with the invention can be returned to the source, stored, transported, sold, or otherwise reused.

14 Claims, 3 Drawing Sheets

(56) References Cited

U.S. PATENT DOCUMENTS

| | | | |
|---|---|---|---|
| 5,405,497 A | 4/1995 | Torregrossa | |
| 5,529,701 A | 6/1996 | Grisham et al. | |
| 5,531,904 A | 7/1996 | Grisham et al. | |
| 5,858,237 A | 1/1999 | Hashmi et al. | |
| 6,602,327 B2 | 8/2003 | Morse et al. | |
| 6,949,195 B2 | 9/2005 | Morse et al. | |
| 7,934,606 B2 | 5/2011 | Greene et al. | |
| 8,281,932 B2 | 10/2012 | Schneider et al. | |
| 8,286,805 B2 | 10/2012 | Hopper | |
| 8,313,565 B2 | 11/2012 | Sarshar et al. | |
| 8,475,664 B2 | 7/2013 | Keyser et al. | |
| 8,486,338 B2 | 7/2013 | Dickinson | |
| 8,529,772 B2 | 9/2013 | Hopper | |
| 9,663,385 B2 * | 5/2017 | Jones | C02F 1/24 |
| 2003/0121416 A1 | 7/2003 | Morse et al. | |
| 2003/0153059 A1 | 8/2003 | Pilkington et al. | |
| 2005/0172808 A1 | 8/2005 | Yi | |
| 2010/0006516 A1 | 1/2010 | Schook | |
| 2011/0300029 A1 | 12/2011 | Foret | |
| 2012/0118818 A1 | 5/2012 | Moraes et al. | |
| 2013/0146535 A1 | 6/2013 | Albert | |
| 2013/0146536 A1 | 6/2013 | Tarabara et al. | |

FOREIGN PATENT DOCUMENTS

| | | |
|---|---|---|
| CN | 1358552 A | 12/2001 |
| CN | 1546196 A | 12/2003 |
| CN | 200945382 Y | 7/2006 |
| CN | 200981025 Y | 10/2006 |
| CN | 101362629 A | 7/2007 |
| CN | 101793138 A | 3/2010 |
| RU | 5586 U1 | 12/1997 |
| SU | 1247093 A1 | 7/1986 |
| UA | 74981 C2 | 9/2004 |
| WO | 88/09696 A1 | 6/1987 |
| WO | WO01/51164 A1 | 7/2001 |
| WO | WO2012/071672 | 6/2012 |

OTHER PUBLICATIONS

International Search Report and Written Opinion for PCT/US 2014/063999 dated Apr. 9, 2015 (dated Apr. 9, 2015), corresponding to U.S. Appl. No. 14/265,412.

* cited by examiner

LIQUID PURIFICATION SYSTEM

CROSS REFERENCE TO RELATED APPLICATIONS

This application is a continuation of co-pending non-provisional application Ser. No. 14/265,412, filed Apr. 30, 2014, which claims priority to provisional patent application Ser. No. 61/902,258, filed Nov. 10, 2013, both of which are incorporated herein by reference in their entirety.

FIELD OF THE INVENTION

The present invention relates to purification of various liquids, particularly water contaminated with sulfur compounds, volatile organic chemicals, crude oil, fracturing fluids, hydrocarbons, or other materials.

BACKGROUND OF THE INVENTION

Discovery, acquisition, refinement, use, recovery, and remediation of naturally occurring hydrocarbons such as petroleum products, minerals, and other materials can be complex, expensive, and environmentally challenging. Various devices and methods have been developed over the years to solve or aid these challenges and concerns.

In the area of petroleum exploration and production from terrestrial sources, pressurized fracturing fluids are sometimes used. The pressurized fracturing fluids are injected into putative or operational oil wells, creating cracks in geological formations at or near sources of petroleum products. The cracks allow oil and gas to escape from beneath the surface of the earth. The oil and gas are collected with particularized apparatuses at the surface. The fracturing fluids are also released in the process. The hydraulic fracturing fluids are emitted from the earth as a mixture of water, various chemicals, hydrocarbons, natural occurring substances, and proppants. A goal in industry is to sufficiently cleanse water from used fracturing fluids for reuse in making fresh fracturing fluid for further fracturing operations. Another goal is to cleanse water found in used fracturing fluids to a degree where it is environmentally acceptable for disposal at an above-ground location or facility. An ultimate goal is to cleanse water from used fracturing fluid to a point where it is in the form of potable water.

In addition to fracturing fluids, water is often found in crude oil obtained from an oil well. Separation of water from the crude oil is performed above ground. The separation technique used is typically a static gravity collection system consisting of large holding tanks in combination with an oil—water separator system. This process usually requires a long time for the oil and water mixture to separate as it resides in the large holding tanks. As a result, oil—water separator systems are not particularly efficient or cost effective.

Water is also used to obtain crude oil, gas, and other petroleum products from submarine locations. The water used in submarine, or off shore, oil production usually becomes contaminated with a variety of substances during the production process. Off shore oil wells produce a substantial amount of "sour water" in the course of pumping crude oil. The sour water is usually a mixture of brackish water, hydrogen sulfide, hydrogen sulfide ions, and various hydrocarbons. A significant problem associated with using sour water is the sulfur content of the sour water. Sulfur in sour water is primarily found it two forms—hydrogen sulfide and hydrogen sulfide ions. In addition to sulfur compounds in sour water, hydrocarbons and other petroleum products or compounds are problematic in sour water. If sulfur containing compositions, petroleum products, and volatile compounds could be substantially removed from sour water, the sour water would be rendered sufficiently clean to be responsibly returned to the ocean or disposed of on land. In addition, water is often found in crude oil, gas, and other petroleum products obtained in an off shore production process. Separating water from these materials would enable the materials to be utilized rather than remaining of little or no use and in some cases hazardous.

One method of cleansing sour water or removing water from fracturing fluids, petroleum, and petroleum products involves reacting or mixing a gaseous composition, such as air, carbon dioxide, or other appropriate gas with these materials under certain conditions. In some circumstances, for example, an air sparged hydrocyclone apparatus is used for the flotation or cleaning of coal, for the flotation or processing of tar sands, and for separating minerals from their host material by flotation. U.S. Pat. Nos. 4,279,743; 4,397,741; and 4,399,027, each issued to Miller, disclose an air sparged hydrocyclone apparatus. While the apparatuses of Miller and others may be able to separate solid materials from water, the solids are often recovered in relatively small amounts. In practice, recovery of small amounts of solid materials with these apparatuses and methods is usually below the requirements of industry. Furthermore, Miller does not disclose an apparatus or method capable of separating hydrocarbons, volatile organic compounds, or sulfur-containing compounds from water.

Shumeng, et al. disclose an air sparged hydrocyclone unit in published Chinese patent application No. 200620148747.2 (Patent ID: CN 200981025 Y). According to Shumeng, et al., the hydrocyclone unit is used for separating oil from water. In contrast with the present invention, the apparatus of Shumeng, et al. does not utilize negative pressure in conjunction with the apparatus. Nor does the hydrocyclone unit of Shumeng et al. have unrestricted outflow through a lower opening in the apparatus. Rather, a tapered outlet restricts outflow from the unit.

Kalnins discloses a hydrocyclone unit in Published PCT application No. WO 88/09696. The hydrocyclone unit utilizes a pressure-reducing device in the form of a venturi positioned at the end of a fluid inlet where inflowing contaminated liquid is introduced to the lower end of the hydrocyclone unit. The negative pressure created by the venturi increases the rate of flow of the inflowing contaminated liquid. Kalnins does not use negative pressure to separate hydrocarbons, volatile organic compounds, or sulfur-containing compositions from liquids, such as water. Nor does the hydrocyclone unit of Kalnins provide unrestricted outflow of water and contaminants from the unit.

None of these references discloses an apparatus or method capable of eliminating or substantial reducing contaminants such as hydrocarbons, volatile organic compounds, sulfur, hydrogen sulfide, hydrogen sulfide ions, crude oil, or other petroleum products from water.

SUMMARY OF THE INVENTION

The present invention relates to an apparatus and method of removing contaminants from water. In particular, the present invention relates to a specialized gas sparged hydrocyclone apparatus capable of cleansing or purifying liquid water contaminated with hydrocarbons, hydraulic fracturing fluids, volatile organic compounds, sulfur, hydrogen sulfide, hydrogen sulfide ions, crude oil, or other petroleum products. The invention also relates to a method of removing hydrocarbons, hydraulic fracturing fluids, volatile organic compounds, sulfur, hydrogen sulfide, hydrogen sulfide ions, crude oil, or other petroleum products from water, often in substantial amounts. Water cleansed or purified of these and other substances can often be reused in a particular process or used for a different purpose.

The specialized gas sparged apparatus of the present invention comprises a hydrocyclone top, or head portion, secured to a rigid container located below the hydrocyclone top. The hydrocyclone top has an inlet for accepting and directing contaminated liquid water into the hydrocyclone top. The hydrocyclone top has two outlets, referred to herein as an upper outlet and a lower outlet. The lower outlet directs the contaminated liquid water from the hydrocyclone top downwardly into a sparger located below the hydrocyclone top. The upper outlet is positioned above the hydrocyclone unit. The upper outlet accepts and directs upwardly flowing contaminates and residual water out of the sparger and hydrocyclone combination.

The sparger is a porous substantially cylindrical element positioned and retained inside the rigid container. In preferred embodiments, the sparger is made of sintered stainless steel. The rigid container has one or more inlets traversing one or more walls of the rigid container. The inlets are in fluid communication with a plenum positioned between inner walls of the rigid container and outer surfaces of the sparger. In use, an appropriate stripping gas is fed under pressure through the one or more inlets to the plenum. Once in the plenum, the stripping gas flows from the plenum through the pores of the sparger into a substantially cylindrical hollow interior area of the sparger. The hollow interior area of the sparger is located substantially in the center of the sparger. The hollow interior area of the sparger has an unrestricted opening at opposite ends, referred to herein as an upper opening and a lower opening. The unrestricted lower opening in a lower, or bottom, portion of the hollow interior area permits cleansed or purified water to directly flow out of the sparger into a first reservoir positioned beneath the rigid container. The upper unrestricted opening in the hollow interior area of the sparger is in fluid communication with a vortex finder, or upper nozzle, located in the upper outlet of the hydrocyclone top. In use, contaminants and residual water exit the sparger through the unrestricted upper opening and vortex finder. One end of a conduit is attached to the vortex finder. An opposite end of the conduit is attached to a second reservoir. Contaminants and residual water are conveyed from the sparger through the conduit to the second reservoir. A source of negative pressure or partial vacuum is provided to the second reservoir. The source of negative pressure or partial vacuum is in fluid communication with the hollow interior area of the sparger and the first reservoir. Regulated outlets are provided to the first reservoir and the second reservoir.

In the process, contaminated liquid water is fed from a conduit through the inlet of the hydrocyclone top. The hydrocyclone top causes the incoming contaminated liquid water to acquire a circular flow and temporarily circulate within the hydrocyclone top. The circulating contaminated liquid water moves downwardly through the lower outlet of the hydrocyclone top in a spiraling or swirling fashion to form a vortex in the hollow interior area of the sparger. When the stripping gas passes, or percolates, into the hollow interior area of the sparger in the presence of contaminated liquid water, the stripping gas forms numerous bubbles in the contaminated water. The vortex aids in mixing the bubbles with the contaminated liquid water in the hollow interior area of the sparger. A froth or foam of stripping gas and contaminated liquid water is formed as a result of the mixing action. The contaminants are captured and separated from most or all of the contaminated liquid water by the bubbles in the froth or foam. Under the influence of negative pressure or partial vacuum present in the apparatus, a portion of the froth or foam collapses and transforms into a stream of liquid water substantially free of contaminants. Collapse of the froth or foam occurs above the bottom of the sparger. The stream of liquid water, stripped or otherwise substantially removed of contaminants, continues to flow downwardly through the unrestricted lower opening in the lower portion of the sparger directly into the first reservoir, or storage vessel, located beneath the hydrocyclone apparatus. Also with the aid of negative pressure or partial vacuum present in the apparatus, contaminate-containing froth or foam flows upwardly in the hollow interior area of the sparger. The upwardly flowing contaminate-containing froth or foam flows out of the hollow interior area of the sparger through the vortex finder in the upper outlet in the hydrocyclone top and into the conduit. The contaminate-containing froth or foam moves through the conduit into the separate second reservoir. Once in the second reservoir, the froth or foam completely disintegrates or collapses. The contaminate-containing liquid water component of the froth or foam drops to a bottom portion of the second reservoir. The liquid water and any dissolved contaminates residing in the bottom of the second reservoir flow out of the second reservoir through a regulated opening or conduit in the bottom of the second reservoir for appropriate handling. Volatile compounds, hydrocarbons, inorganic compositions, or other contaminants are also present in the froth or foam. As the froth or foam disintegrates in the second reservoir, volatile compounds, hydrocarbons, inorganic compositions, or other contaminants present in the froth or foam separate from the froth or foam. Many of these materials enter a gaseous phase. The volatile compounds, hydrocarbons, inorganic compositions, or other contaminants reside in an upper portion of the second reservoir separate from the liquid water present in the bottom portion of the second reservoir. Negative pressure or partial vacuum in the second reservoir can also remove volatilizable materials remaining in the liquid water. The volatile compounds, hydrocarbons, inorganic compositions, or other contaminants flow out of the upper portion of the second reservoir through an opening or conduit where they are recovered for appropriate disposal or use.

Accordingly, one embodiment of the present invention relates to a liquid purification apparatus comprising a hydrocyclone top, a rigid container disposed beneath said hydrocyclone top, a sparger in said rigid container, a plenum between said rigid container and said sparger, at least one gas inlet in said rigid container in fluid communication with said plenum, a first reservoir beneath said sparger, wherein said sparger has a hollow interior area with open end in unrestricted fluid communication with said first reservoir, a second reservoir in fluid communication with said hollow interior area of said sparger, and a vacuum pump attached to said second reservoir.

Another embodiment of the present invention relates to a liquid purification apparatus comprising a containment vessel having at least one rigid wall, at least one gas inlet attached to said at least one rigid wall of said containment vessel, wherein said containment vessel has at least one hollow area therein, wherein said containment vessel has a first end and a second end, a rigid substantially cylindrical microporous tube with a hollow interior and an opening at each end, wherein said tube is positioned in said at least one hollow area of said containment vessel and hermetically sealed to said containment vessel at each end of said tube, a housing attached to said first end of said containment vessel, wherein said housing has an interior space delimited by a substantially curved inner wall, wherein said interior space has a center, an aperture in said substantially curved inner wall and a fluid inlet attached to said housing at an angle relative to a center point in said housing and in fluid communication with said aperture, a first outlet attached to said housing in fluid communication with said interior space, a second outlet attached to said housing at a substantially perpendicular angle and in fluid communication with said interior space, wherein said second outlet has a central axis substantially aligned with said center of said interior space, wherein said first outlet is positioned on said housing substantially opposite said second outlet, wherein said second outlet is in fluid communication with one opening of said tube, a first reservoir attached to said second end of said containment vessel and in fluid communication with an open end of said tube, a fluid conduit having two ends, wherein one end of said fluid conduit is attached to said first outlet and hermetically sealed thereto, wherein a second end of said fluid conduit is attached to an inlet of a second reservoir and hermetically sealed thereto, and wherein said second reservoir is attached to an inlet of a venturi vacuum system.

Another embodiment of the present invention relates to a method of stripping contaminants from sour water comprising the steps of providing a hydrocyclone unit including a hydrocyclone top, a rigid container disposed beneath said hydrocyclone top, a sparger in the rigid container, a plenum between said rigid container and said sparger, a first reservoir beneath said sparger, wherein said sparger has an open end in unrestricted fluid communication with said first reservoir, providing a flow of sour water to said hydrocyclone top and into said sparger, providing a flow of stripping gas to said sparger, mixing said stripping gas with said sour water in the sparger to provide a sour water-containing froth and stripped water, capturing said sour water-containing froth from said hydrocyclone unit, separating stripping gas from said sour water-containing froth, disposing said stripping gas, and capturing said water stripped of sour water contaminants from said sparger.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE INVENTION

Figure 1:
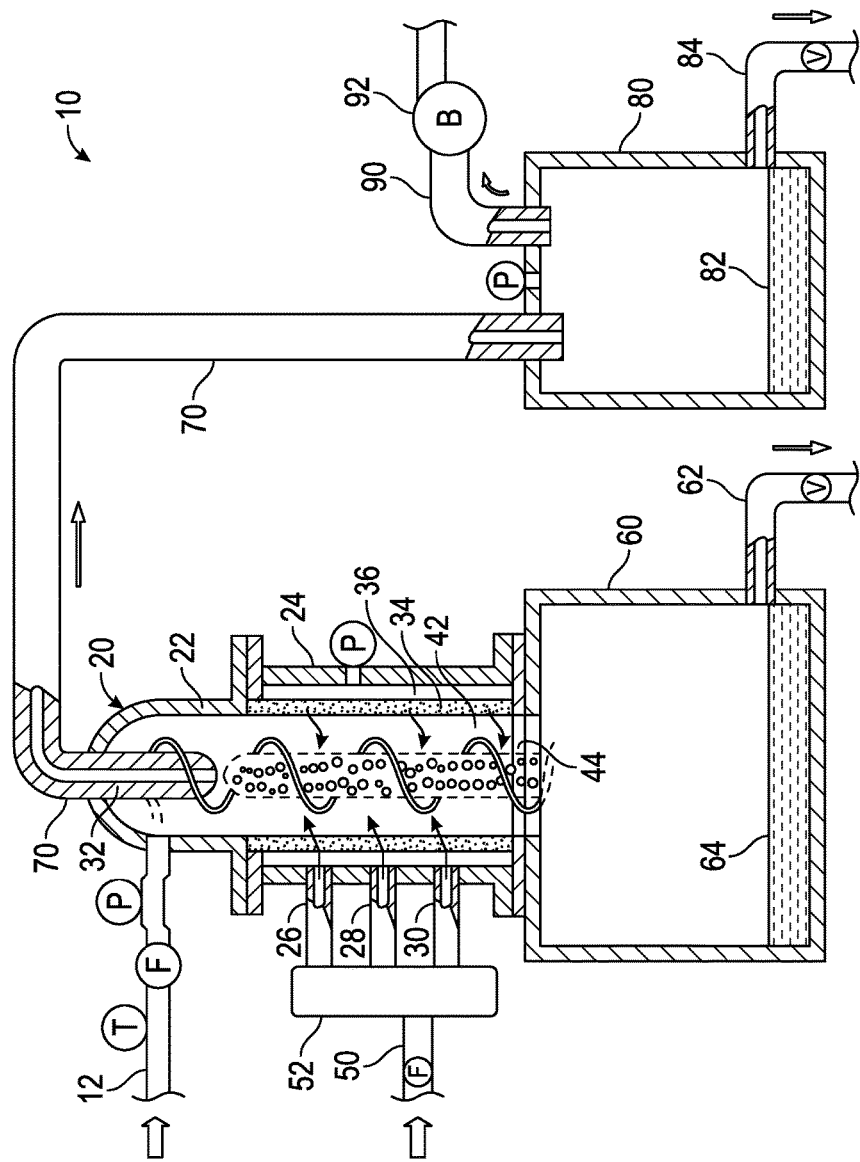
FIG. 1 illustrates a schematic block diagram, with elements in partial section, of an air sparged hydrocyclone system suitable for use in the present invention.

FIG. 1 is a schematic block diagram of apparatus 10, portions of which are in partial section. FIG. 1 also illustrates a method of removing hydrocarbons, hydraulic fracturing fluids, volatile organic compounds, sulfur, hydrogen sulfide, hydrogen sulfide ions, crude oil, or other petroleum products with the apparatus 10. Water contaminated with hydrocarbons, hydraulic fracturing fluids, volatile organic compounds, sulfur, hydrogen sulfide, hydrogen sulfide ions, crude oil, or other petroleum products flows in a feed conduit 12 to a specialized gas sparged hydrocyclone unit 20. The flow rate in the conduit 12 may vary from about fifteen (15) gallons per minute to about thirty (30) gallons per minute. A flow of about fifteen (15) gallons per minute (gpm) is preferred.

Appropriate sensors, such as temperature, pressure, and flow rate, and valves, indicated respectively by T, P, F, and V, are associated with the various elements of the apparatus 10. Other appropriate valves and related equipment, not shown, are also associated with the conduit 12. Sensors and other control devices may be added as desired.

The unit 20 includes a hydrocyclone top 22 disposed at the top of a rigid container 24. The rigid container 24 can have many forms including, but not limited to, straight and/or curved tubes of various cross-sections, spheres, cubes, rectangular boxes, cylinders, ovoids, and combinations thereof. The rigid container can be made of a variety of materials including, but not limited to, metals, ceramics, polymers, composites, and combinations thereof. A preferred material for the rigid container 24 is steel. The conduit 12 is connected to the hydrocyclone top 22. Within the rigid container 24 is a sparger 34. The rigid container 24 and the sparger 34 are secured to a first reservoir, "underflow drum," or "residual disengagement vessel" 60 positioned beneath, or under, the rigid container 24 and sparger 34 combination.

As illustrated in FIG. 1, the sparger 34 is located within the rigid container 24. The inner diameter of the rigid container 24 is greater than the outer diameter of the sparger 34. Between the sparger 34 and the rigid container 22 is a plenum 36. Gas inflowing from a conduit 50 and manifold 52 flows into the plenum 36 under pressure through at least one input conduit, runner, or inlet. Preferably, a plurality of input conduits, runners, or inlets is used. Three such input conduits, runners, or inlets 26, 28 and 30 are illustrated in FIG. 1. Gas flow to the rigid container 24 from the manifold 52 may vary in accordance with the flow rate in the feed conduit 12 of water contaminated with hydrocarbons, hydraulic fracturing fluids, volatile organic compounds, sulfur, hydrogen sulfides, hydrogen sulfide ions, crude oils, or other petroleum products. The gas flow rate is measured in standard cubic feet per minute (scfm). Gas flow to the rigid container 24 from the manifold 52 may vary from about five (5) scfm to about fifteen (15) scfm. The reacting or stripping gas in the conduit 50 may be air, oxygen, carbon dioxide, nitrogen, argon, helium, or other appropriate gas. The sparger 34 is porous to the flow of a desired stripping gas. The positive pressure in the plenum insures the inwardly flowing stripping gas moves through the pores in the sparger 34 relatively uniformly along the length of the sparger. Uniform movement of stripping gas through the sparger 34 evenly mixes the stripping gas with a downward spiraling flow of water contaminated with hydrocarbons, hydraulic fracturing fluids, volatile organic compounds, sulfur, hydrogen sulfides, hydrogen sulfide ions, crude oils, or other petroleum products. In preferred embodiments, the sparger 34 is porous through the entire sintered tube. Initially, stripping gas from the conduit 50 flows through one or more inlets of the rigid container 24 into the plenum 36. The stripping gas is at a pressure sufficient to cause the stripping gas to flow through the pores of the sparger 34. As the stripping gas flows from the plenum 36 through the pores in the sparger 34, the gas enters a chamber 42 in an interior area of the sparger.

The hydrocyclone top 22 induces a swirling or spiraling motion in the downwardly flowing contaminated water to form a vortex. As the stripping gas enters the interior area of the sparger in the presence of contaminated water, numerous gas bubbles are formed. The gas bubbles mix with the hydrocarbons, hydraulic fracturing fluids, volatile organic compounds, sulfurs, hydrogen sulfides, hydrogen sulfide ions, crude oils, or other petroleum products in the contaminated water. As a result, a froth or foam is formed in the interior area of the sparger 34. The froth or foam contains a mixture of liquid water and hydrocarbon, hydraulic fracturing fluid, volatile organic compound, sulfur, hydrogen sulfide, hydrogen sulfide ion, crude oil, or other petroleum product contaminants.

A vacuum pump or blower 92 in the conduit 90 causes a negative pressure or partial vacuum to be generated in the second reservoir, overflow vessel, separator, surge vessel, or drum 80. The negative pressure or partial vacuum extends into conduit 70 through the hydrocyclone head 22 and into the interior of the sparger 34. With the application of negative pressure or partial vacuum, the hydrocarbon, hydraulic fracturing fluid, volatile organic compound, sulfur, hydrogen sulfide, hydrogen sulfide ion, crude oil, or other petroleum product-containing portion of the froth or foam flows upwardly in the sparger, out of the hydrocyclone top 22, through a vortex finder or upper nozzle 32 in the hydrocyclone top 22, and into a conduit 70. The upwardly flowing frothy or foamy mixture of residual water and contaminates flows through the conduit 70 to a second reservoir, overflow vessel, separator, surge vessel, or drum 80. As the hydrocarbon, hydraulic fracturing fluid, volatile organic compound, sulfur, hydrogen sulfide, hydrogen sulfide ion, crude oil, or other petroleum product-containing froth or foam enters the second reservoir, the froth or foam collapses or otherwise disintegrates under the influence of negative pressure or partial vacuum present in the second reservoir.

As the froth or foam collapses or disintegrates in the second reservoir, residual liquid water and any dissolved, suspended, admixed, or emulsified materials separate from the foam or froth and drop to a bottom portion of the second reservoir, overflow vessel, separator, surge vessel, or drum 80. The residual water and any dissolved, suspended, admixed, or emulsified materials flows outwardly from the bottom portion of the second reservoir, overflow vessel, separator, surge vessel, or drum 80 through a regulated conduit 84 for appropriate disposition. Large arrows by the respective conduits in FIG. 1 show the direction of flow of the various materials.

As residual liquid water and any dissolved, suspended, admixed, or emulsified materials separate from the disintegrating or collapsing froth or foam, the hydrocarbon, hydraulic fracturing fluid, volatile organic compound, sulfur, hydrogen sulfide, hydrogen sulfide ion, crude oil, or other petroleum product contaminants also separate from the froth or foam. The hydrocarbon, hydraulic fracturing fluid, volatile organic compound, sulfur, hydrogen sulfide, hydrogen sulfide ion, crude oil, or other petroleum product contaminants occupy an upper portion of the second reservoir apart from the liquid water residing in the bottom of the second reservoir. The hydrocarbons, hydraulic fracturing fluids, volatile organic compounds, sulfur, hydrogen sulfides, hydrogen sulfide ions, crude oils, or other petroleum products exit the upper portion of the second reservoir through an opening or conduit 90 where these and other volatile and/or gaseous materials are recovered for appropriate disposal or use.

The negative pressure or partial vacuum in the second reservoir, overflow vessel, separator, surge vessel, or drum 80 also helps to disengage any remaining volatizable products from liquid water residing in the bottom portion of the second reservoir, overflow vessel, separator, surge vessel, or drum 80.

The downwardly flowing water, minus the contaminating hydrocarbons, hydraulic fracturing fluids, volatile organic compounds, sulfur, hydrogen sulfides, hydrogen sulfide ions, crude oils, or other petroleum products which have been captured in the upwardly flowing froth or foam within the sparger 34, freely flows into a first reservoir, "underflow drum," or "residual disengagement vessel" 60 through an unrestricted opening in the bottom, or lower, end 44 of the sparger 34. Liquid water free of hydrocarbons, hydraulic fracturing fluids, volatile organic compounds, sulfur, hydrogen sulfides, hydrogen sulfide ions, crude oils, or other petroleum products flows out of the first reservoir, "underflow drum," or "residual disengagement vessel" 60 through a conduit 62 and returns to a storage tank (not shown). An appropriate level of cleansed or purified liquid water is maintained in the first reservoir, "underflow drum," or "residual disengagement vessel" 60 by controlling outflow of the cleansed or purified liquid water into the conduit 62. The liquid water level in the first reservoir, underflow drum, or residual disengagement vessel 60 is indicated by reference numeral 64.

The flow of the froth or foam from the chamber within the sparger 34 is dynamically moved due to the differential pressure between the first reservoir, "underflow drum," or "residual disengagement vessel" 60 and the second reservoir, overflow vessel, separator, surge vessel, or drum 80.

The apparatus 10, including the hydrocyclone unit 20, with its hydrocyclone top 22, the rigid container 24, and the upper nozzle or vortex finder 32, the first reservoir, "underflow drum," or "residual disengagement vessel" 60, second reservoir, overflow vessel, separator, surge vessel, or drum 80, and the various conduits comprise a sealed system. The negative pressure or partial vacuum in the system from the blower 92 is about six (6) inches of mercury (Hg).

Figure 3:
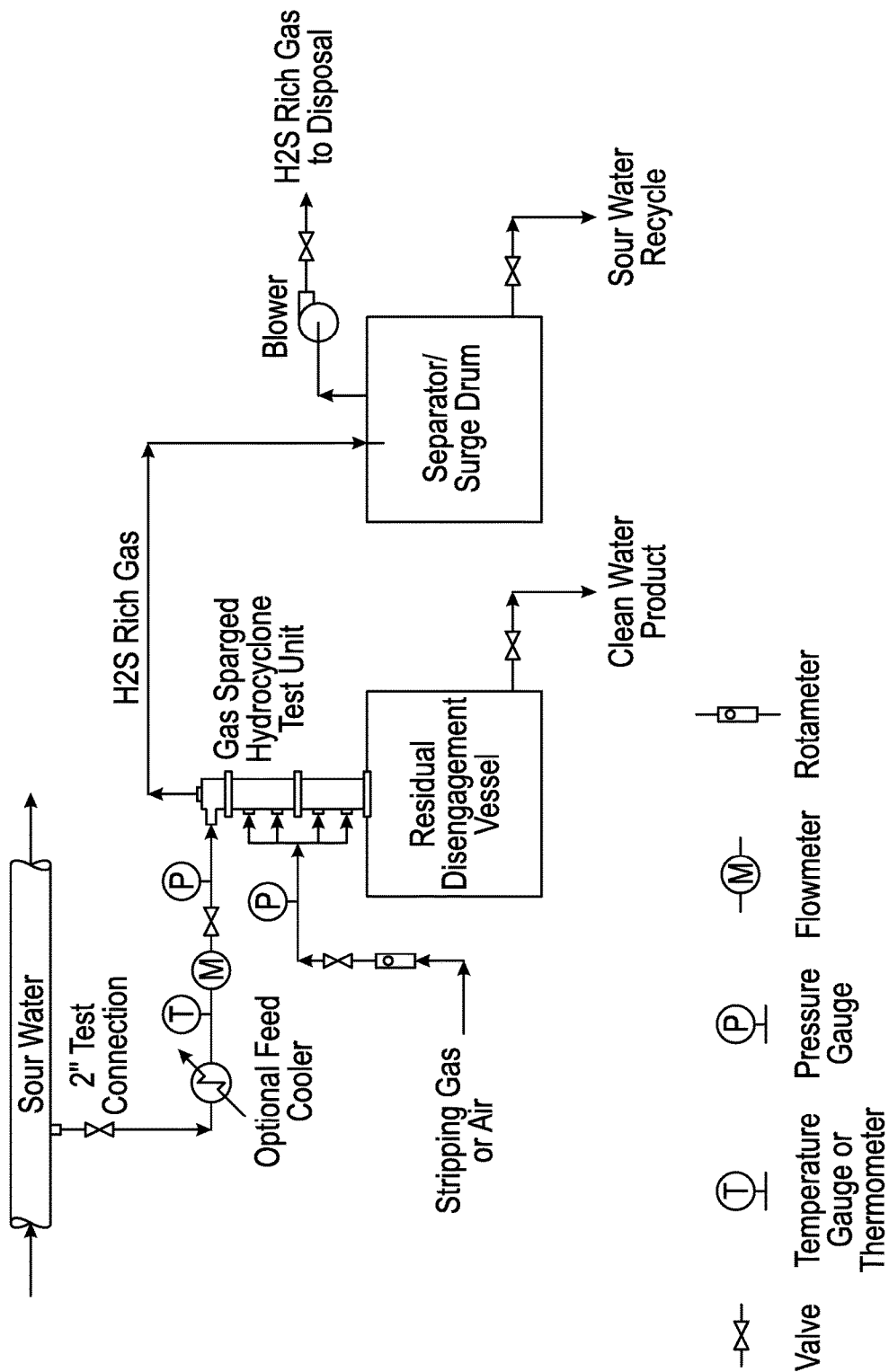
FIG. 3 illustrates a schematic diagram of present invention in the form of a system. The system includes an apparatus of the present invention, associated equipment, and indications of a method of using the apparatus.

The generally spiraling downward liquid flow in the sparger 34 is schematically illustrated in FIG. 1 by arrows and the generally upwardly flow of the foam or froth is also schematically illustrated in FIG. 1 by arrows. Similarly, the flow of the stripping gas through the pores in the sparger is schematically illustrated in FIG. 1 by small arrows. FIG. 3 illustrates the present invention in schematic form. The schematic illustration shows a source of contaminated water (e.g., sour water), a conduit transporting contaminated water to the gas reactor, a source of stripping gas and accompanying manifold and gas inlets, a first reservoir (residual disengagement vessel), an outlet from the first reservoir, a conduit connecting the gas reactor to a second reservoir (separator or surge drum), a conduit connected to a blower (i.e., a source of negative pressure or partial vacuum), and an outflow conduit for the second reservoir. Various meters or gauges and valves or regulators are also illustrated. Arrows in FIG. 3 show the direction of flow of contaminated water, stripping gas, froth or foam, and reaction products in the system.

Figure 2:
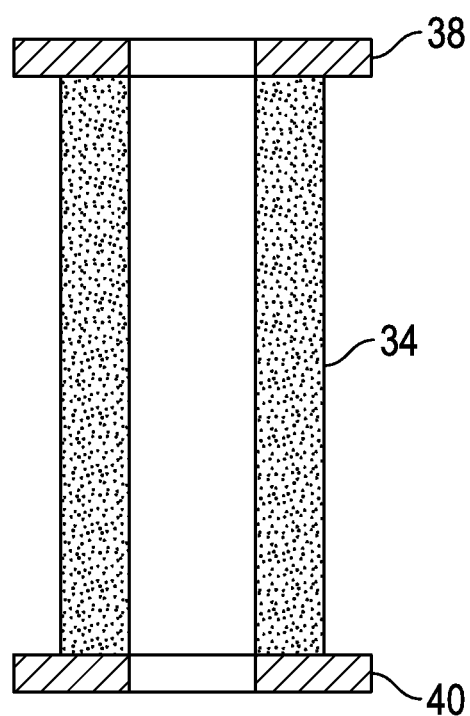
FIG. 2 illustrates a cross-sectional view of an air sparger suitable for use in the present invention.

FIG. 2 is an enlarged view in partial section through the sparger 34 of FIG. 1. For the following discussion, reference will primarily be made to FIG. 2, but reference will also be made to FIG. 1.

The sparger 34 comprises a tube or pipe made of one or more porous materials. Suitable materials for the sparger 34 include, but are not limited to, sintered metallic particles, porous high density polyethylene, porous foil mesh, porous ceramic membrane made from aluminum oxide and/or silicon carbonate membrane. Preferred sintered metallic particles are stainless steel. The pores in the sintered tube are of such a size as to permit the flow of a gas through the tube or pipe and into the interior of the sparger element, but not permit liquids to pass therethrough when gas is flowing through the sparger. Pores in the sintered tube range in size from about five microns (5 μm) to about eighty microns (80 μm). In some embodiments, the pore size ranges from 15 about microns (15 μm) to about 45 microns (45 μm). In some embodiments, the pore size in the sintered tube ranges from about fifteen microns (15 μm) to about twenty-five microns (25 μm). In other embodiments, the pore size of the sintered tube ranges from about twenty-five microns (25 μm) to about forty microns (40 μm). In other embodiments, the pore size of the sintered tube ranges from about thirty microns (30 μm) to about forty-five microns (45 μm). In yet other embodiments, the pore size of the sintered tube ranges from about thirty-five microns (35 μm) to about forty microns (40 μm).

Referring to FIG. 2, the sparger 34 also includes a pair of plates, a top plate 38 and a bottom plate 40. The plates 38 and 40 are outwardly extending flanges which provide the elements for sealing and securing the sparger to the hydrocyclone head 22, the rigid container 24, and the first reservoir, "underflow drum," or "residual disengagement vessel" 60.

Appropriate securing and sealing elements, such as bolts, o-rings, welds, and the like have been omitted from the drawing figures. It is understood the various elements, including the various conduits and sensors, are appropriately secured and sealed in the apparatus and system.

The sparger element has been described in conjunction with the stripping of contaminating products from water, it will be understood that such sparger may also be used in other applications. Another application is for the removal of contaminates from water such as volatile organic compounds or petroleum products.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

EXAMPLES

Example 1

This example describes an embodiment of the present invention. In this embodiment, a first component of a water purification apparatus, also referred to herein as a gas reactor, was constructed and attached to an upper portion of a first reservoir, "underflow drum," or "residual disengagement vessel". A second reservoir, "overflow vessel," separator, "surge vessel," or drum, was attached in fluid communication to an outlet of the first component. An outlet from the second reservoir was attached in fluid communication to an inlet of a venturi vacuum system. Optionally, a pressure reducing device such as a vacuum pump was attached to the second reservoir, overflow vessel, separator, surge vessel, or drum.

The first component, referred to as a containment vessel, rigid container, or gas reactor had a main body made of two substantially identical parts. Each containment vessel part was constructed from a Standard Schedule 40, 316 S.S. pipe with an outer diameter of 10.16 cm (4.0 inch) and an inner diameter of 9.02 cm (3.55 inch). The containment vessel part was cut to a length of 35.6 cm (14 inches). A machined stainless steel flat face plate, 15.24 cm (6.0 inch) in diameter and 1.27 cm (0.5 inch) thick, was welded to each end of each containment vessel part. Each flange had a 6.35 cm (2.5 inch) diameter hole through the center of the flange. Arrayed around each centrally located 6.35 cm (2.5 inch) diameter hole were four substantially equally spaced bolt holes drilled at a substantially ninety-degree (90°) angle with respect to the flat surface of each flange. Each bolt hole was sized to accept a 0.95 cm (0.38 inch) by 3.81 cm (1.5 inch) stainless steel hex-head bolt.

A rigid substantially cylindrical microporous tube with a hollow interior and an opening at each end was machined for each containment vessel. Each microporous tube, also referred to herein as a sintered gas generator or gas sparger, was 5.1 cm (2 inches) in outer diameter and 34.3 cm (13.5 inches) in length. The wall of each microporous tube was 0.31 cm (0.125 inch) in thickness. Each microporous tube was made of sintered stainless steel particles. Gas permeable pores delimited by the sintered stainless steel particles traversed the wall of each microporous tube and had average diameters in a range from about twenty-five microns (25 μm) to about forty microns (40 μm).

A stainless steel support fitting in the form of a ring having a 6.67 cm (2.63 inch) outer diameter, a 4.45 cm (1.75 inch) inner diameter, and a 1.27 cm (0.5 inch) thickness was welded to each end of each microporous tube. A microporous tube with welded support fittings was placed inside each containment vessel through one of the 6.35 cm (2.5 inch) centrally located holes in the welded flanges of the vessel. Once a supported microporous tube was placed inside a containment vessel, the support fittings were positioned inside the centrally located holes in the respective flanges. Distal surfaces of each support fitting were on the same plane, or flush, with exterior surfaces of each flange. A small space existed between each support fitting and the wall of each centrally located hole in each flange. An appropriately sized rubber "O" ring was inserted into the space between each support fitting and flange hole. Each microporous tube was thereby contained within and hermetically sealed to each containment vessel.

The first containment vessel was attached to the second containment vessel with a 0.95 cm (0.38 inch) diameter by 3.81 cm (1.5 inch) stainless steel hex-head bolts placed through the bolt holes in the respective flanges at each end of each containment vessel. The entire length of the first containment vessel and attached second containment vessel (i.e., gas reactor) was 71.1 cm (28 inches).

Each containment vessel had two (2) connection ports, or gas inlets, 1.9 cm (0.75 inches) in inner diameter (I.D.) welded to each side thereof. The inlets were in fluid communication with interior portions of each respective containment vessel and substantially equally spaced from each other. The inlets permitted entry of air or other gases into a space, or plenum, between inner walls of the respective containment vessels and outer surfaces of the respective microporous tubes contained therein. A pressure gauge was attached to the containment vessel in fluid communication with the plenum area of the gas reactor. The pressure gauge was rated at 0-30 pounds per square inch gauge (psig). Once inside the containment vessels, air or other gases were free to enter and traverse pores of each microporous tube. Air or other gases exiting the pores of each microporous tube entered an inner hollow area of each tube and were free to move through open ends of each tube.

The air or other gases introduced into the plenum of the gas reactor were void of small particles, such as scale and/or dust. If such particles were present in the air or other gases, the particles could enter and obstruct the pores of the microporous tube. Accordingly, a filter having a ten micron (10 μm) pore size was placed inline of a hose, or conduit, supplying the air or other gases to the gas reactor. Pressure of the filtered air or other gases was controlled with a pressure regulator and fed downstream to a 0-100 standard cubic feet per minute (SCFM) rotor meter. The filtered air or other gas moved at flow rate of twenty-five (25) SCFM and a pressure of ninety (90) psig.

The combined containment vessels and contained microporous tubes, constituted a single containment vessel (i.e., gas reactor). When in a vertical orientation, the containment vessel, or gas reactor, had a top end and a bottom end.

One end (i.e., bottom end) of the containment vessel was attached with bolts to a first reservoir or residual disengagement vessel. In this embodiment, the first reservoir was a standard fifty-five (55) gallon steel drum with a corrosion-resistant coating material on interior surfaces of the drum. The drum had a standard lock ring top. The first reservoir had an opening in an upper surface thereof in fluid communication with the hollow interior and unrestricted open end of the microporous tube located at the bottom of the containment vessel. In operation, fluids of a particular density or composition were able to freely move from within the microporous tube and easily enter the first reservoir below the containment vessel in an unrestricted flow. The first reservoir was supplied with a 5.1 cm (2 inch) manually operated valve located near the bottom of the reservoir. The valve served to permit liquid retained in the first reservoir to exit the reservoir. The first reservoir was structurally modified to support the weight of the containment vessel, microporous tube, cyclone, and related components.

A Model U2 Krebs Cyclone FLS (The Krebs, Inc., Tucson, Ariz.) was attached to the opposite end (i.e., top end) of the containment vessel in fluid communication with the hollow interior portion of the microporous tube contained therein. The cyclone had one substantially cylindrical-shaped inlet attached to one side (i.e., side inlet) of the cyclone at an angle with respect to a center point in the cyclone. The cyclone also had two cylindrical outlets aligned substantially perpendicular to the inlet and positioned substantially opposite one another on the cyclone housing. The outlets are referred to herein as an upper outlet and a lower outlet. The cyclone had an internal tube referred to herein as a vortex finder placed in the upper outlet of the cyclone.

The side inlet had a 3.8 cm (1.5 inch) outer diameter and was attached to a fitting with a 3.2 cm (1.25 inch) mechanical fitting to join pipes, valves and couplings to plastic, carbon steel/stainless steel and different type fittings. The side inlet served as an entry, or feed, nozzle for introducing contaminated liquids, such as sour water, in need of purification into the cyclone component of the present invention. A feed line attached to the side inlet was used to introduce sour water into the apparatus through the entry nozzle. A manually operated liquid flow meter was installed in the feed line to enable the flow rate of the sour water to be varied as needed. In this example, a pressure of seventy (70) pounds per square inch gauge (psig) and a flow rate of fifty-seven to one hundred fourteen (57-114) liters per minute (LPM) or fifteen to thirty (15-30) gallons per minute (GPM) was used. An inline globe valve and pressure gauge was installed downstream of the flow meter.

The lower cyclone outlet had a 5.1 cm (2 inch) inner diameter and was placed directly over the 5.1 cm (2 inch) hole in the flange and in fluid communication with one end (i.e., upper end) of the microporous tube. The cyclone was mounted to the welded flange at one end (e.g., top end) of the containment vessel with four (4) moveable clips. The cyclone was removable from the flange by loosening and rotating the clips.

The upper outlet of the cyclone had an outer diameter of 3.8 cm (1.5 inch) and was connected directly to the vortex finder. The vortex finder was connected to one end of a tubular fitting. The tubular fitting was bent at a substantially right angle (i.e., 90° angle). The opposite end of the tubular fitting was to attach to a 3.2 cm (2.00 inch) diameter flexible reinforced fluid conduit or hose. When the present invention was in operation, the froth or foam containing contaminants (i.e., dissolved gases, un-dissolved gases, hydrocarbons, volatile organic compounds, sulfur, inorganic compositions such as sulfur-containing compounds, crude oil, and other petroleum products) and residual water readily moved upwardly from within the microporous tube through the vortex finder and into the flexible reinforced fluid conduit connected at an opposite end to a second reservoir. The second reservoir was separate and distinct from the first reservoir. The opposite end of the flexible reinforced conduit was attached to the second reservoir through a 5.1 cm (2 inch) outer diameter fitting attached to the top of the second reservoir. The flexible reinforced conduit was approximately 1.0 m (4.0 feet) in length and maintained in a substantially straight, or linear, configuration during use. The substantially straight flexible reinforced conduit was positioned at a slightly sloping, or declining, angle from the cyclone top to the entry fitting of the second reservoir.

In this embodiment, the second reservoir was a standard fifty-five (55) gallon steel drum with a corrosion-resistant coating material on interior surfaces of the drum. The drum had a standard lock ring top. A venturi device referred to as a Tornado Air Powered Venturi BEM02893 (West Chicago, Ill. 60185) was mounted in fluid communication with interior reservoir areas of the drum and hermetically sealed to the top, or lid, of the drum. In use, the venturi device reduced gas pressure or otherwise created a partial vacuum in the second reservoir. In operation, a partial vacuum or reduced pressure of 12.7 cm (5.0 inches) of mercury (Hg) was produced by the venturi device. The venturi device was driven by a source of air at a pressure of 60 pounds per square inch, gauge (psig). Alternatively, a vacuum pump was attached to the second reservoir in place of or in addition to the venturi device.

Once the froth or foam entered the second reservoir, the reduced pressure or partial vacuum present therein caused the froth or foam to disintegrate or collapse and release various chemical compounds from the froth or foam. The chemical compounds included, but were not limited to, petroleum oil, gaseous compounds, hydrocarbons, sulfur, sulfur-containing compounds, and volatile organic compounds (VOC's). Disassociated concentrated vapors and volatile compounds were discharged through an adaptor attached to the venturi or vacuum unit. A 7.62 cm (3 inch) diameter hose was attached to the venturi vacuum unit and was used to transfer the disassociated concentrated vapors and volatile compounds to a container for appropriate treatment prior to disposal. Liquids in the froth or foam fell to the bottom of the second reservoir as the froth or foam disintegrated or collapsed and were collected through the aforementioned exit valve. Once collected, the liquid from the second reservoir was appropriately treated for disposal or salvage.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

I claim:

1. A liquid purification apparatus comprising:
    a hydrocyclone top with an inlet for accepting and directing liquid into said hydrocyclone top;
    wherein said inlet is attached to said hydrocyclone top at an angle relative to a center point in said hydrocyclone top;
    a rigid container disposed beneath said hydrocyclone top;
    a sparger in said rigid container;
    a plenum between said rigid container and said sparger;
    at least one gas inlet in said rigid container in fluid communication with said plenum;
    wherein said sparger has a hollow interior area with an upper opening and a lower opening;
    a first reservoir in fluid communication with said lower opening of said sparger;
    a second reservoir in fluid communication with said upper opening of said sparger; and
    a source of negative pressure connected to said second reservoir.

2. The liquid purification apparatus of claim 1 wherein said rigid container is metallic.

3. The liquid purification apparatus of claim 1 wherein said rigid container is a non-corrosive organic material.

4. The liquid purification apparatus of claim 3 wherein said non-corrosive organic material is a high density polyvinyl chloride (PVC) material.

5. The liquid purification apparatus of claim 1 wherein said sparger is made of a porous sinstered material.

6. The liquid purification apparatus of claim 5 wherein said porous sinstered material has a multiplicity of pores with an average size of about five microns (5 μm) to about eighty microns (80 μm).

7. The liquid purification apparatus of claim 5 wherein said porous sinstered material has a multiplicity of pores with an average size of about twenty-five microns (25 μm) to about forty microns (40 μm).

8. The liquid purification apparatus of claim 5 wherein said porous sinstered material has a multiplicity of pores with an average size of about thirty microns (30 μm) to about forty-five micros (45 μm).

9. The liquid purification apparatus of claim 5 wherein said porous sinstered material has a multiplicity of pores with an average size of about fifteen microns (15 μm) to about twenty-five microns (25 μm).

10. The liquid purification apparatus of claim 5 wherein said porous sintered material is stainless steel.

11. The liquid purification apparatus of claim 1 wherein said first reservoir has a fluid outlet.

12. The liquid purification apparatus of claim 1 wherein said source of negative pressure is a blower.

13. The liquid purification apparatus of claim 1 wherein said source of negative pressure is a vacuum unit.

14. The liquid purification apparatus of claim 1 wherein said source of negative pressure is a pressure reducing device.

* * * * *